United States Patent Office 2,864,847
Patented Dec. 16, 1958

2,864,847
PRODUCTION OF DIALKYL HYDROGEN PHOSPHITES

Jesse Roger Mangham, Chesterfield County, Va., assignor to Virginia-Carolina Chemical Corporation, Richmond, Va., a corporation of Virginia No Drawing. Application September 14, 1953
Serial No. 380,119

5 Claims. (Cl. 260—461)

This invention relates to a process for the production of dialkyl hydrogen phosphites.

The preparation of dialkyl hydrogen phosphites from aliphatic alcohols and phosphorus trihalide, preferably the trichloride, is generally considered to proceed in two steps as follows:

(1) $\quad 3ROH + PCl_3 \rightarrow (RO)_3P + 3HCl$
(2) $\quad (RO)_3P + HCl \rightarrow (RO)_2POH + RCl$ (R stands for an alkyl group)

When the preparation is carried out in the usual fashion, i. e., by mixing the alcohol and phosphorus trichloride and attempting to remove the excess hydrogen chloride under vacuum, the process suffers the disadvantage that hydrogen chloride reacts with the desired product to yield appreciable amounts of acidic by-products by the following reactions:

(3) $\quad (RO)_2POH + HCl \rightarrow ROP(OH)_2 + RCl$
(4) $\quad ROP(OH)_2 + HCl \rightarrow P(OH)_3 + RCl$ These side reactions, while prevalent for all dialkyl hydrogen phosphites, are especially difficult to prevent in preparations of the lower members of the series. The lowest member, dimethyl hydrogen phosphite, is the most susceptible of all to hydrogen chloride attack. A second disadvantage is the highly exothermic nature of the phorphorus trichloride-alcohol reaction. This reaction is most vigorous when the low molecular weight alcohols are used. On the basis of molecular structure the dialkyl hydrogen phosphites containing primary alkyl groups are more stable to side reaction with hydrogen chloride than are those containing secondary alkyl groups of the same carbon content.

The side reactions with hydrogen chloride can be minimized by reaction at low temperature and by rapid removal of the hydrogen chloride by-product through the use of greatly reduced pressure. The extent to which the temperature of the reaction medium can be lowered is limited by a number of factors, e. g., the capacity of the refrigerating system, viscosities of the solvent and reagents at low temperatures and the difficulty of efficient removal of hydrogen chloride at low temperatures. The removal of hydrogen chloride by evacuation of the reaction vessel is limited by its tendency to remain in solution in oxygenated solvents. As noted above this tendency is aggravated by lower temperatures.

In the specific case of the preparation of dimethyl hydrogen phosphite, the rapid decrease of product yield and purity, which results from an increase in exposure of the product to the hydrogen chloride, is best illustrated by results obtained in actual practice. When the theoretical quantities of methanol and phosphorus trichloride are mixed at about 0° C. and worked-up within an hour after initial mixing, yields above 65% are obtained. In a series of runs at 10° C. where the reaction time was extended to three hours, the average yield dropped to 42%. When the reaction time was lengthened beyond five hours, it was only with difficulty that any product was obtained. The usual result was an uncontrollable decomposition during attempted distillation with a consequent low or negligible yield.

The amount of heat which must be removed in the preparation of dimethyl hydrogen phosphite in the usual way has been estimated at 69,000–92,000 B. t. u. per pound mole. This amount of heat is so large and is evolved from such a small volume of reaction mixture that when the process is run in commercial scale reactors, even those equipped with efficient heat exchangers and large capacity refrigeration units, the time of reaction and evacuation to remove the by-product hydrogen chloride is so long that negligible dimethyl hydrogen phosphite can be recovered.

Methods of overcoming the above difficulties which have been reported rely on the evaporation of a low boiling refrigerant to remove the excess heat and to permit rapid removal of the hydrogen chloride. The refrigerants most highly recommended for this purpose are butane and methyl chloride. The principle behind this type of cooling is the usual refrigeration principle. This allows the removal of the heat of reaction at a low temperature by evaporation of solvent and subsequent removal of the heat from the gaseous solvent by compression and cooling. This cooling of the solvent is done at a much higher thermal level than is the cooling of the reaction mixture. This permits greater refrigeration efficiency. Other advantages over the usual process for making dialkyl hydrogen phosphite are also obtained by the aforesaid refrigerant processes. Among these are intimate mixing brought about by the evaporating refrigerant and the adaptability of the process for continuous operation. However, these processes have several disadvantages. Most important are the limitations brought on by the necessity of handling large volumes of volatile material which require tremendous pumping capacities relative to the size of the batch of product being made. An equally important limitation is the necessity of handling the refrigerant intermingled with the corrosive hydrogen chloride gas. Also a handicap is the requirement that accurate metering of the reactants into a small reaction zone is necessary if good yields are to be obtained. If economics are considered, refrigerant recovery becomes a major problem. The refrigerant must be separated from the hydrogen chloride gas, purified, and finally compressed, condensed and stored for reuse. All of the above become major limiting factors in commercial scale operation.

I have found that the disadvantages inherent in the above described processes for the manufacture of dialkyl hydrogen phosphites may be avoided by removing the hydrogen chloride by-product of the reaction by combination thereof as it is formed with ammonia.

The over-all reactions involved in this process are shown by the following equation. Dimethyl hydrogen phosphite is taken as an illustrative example.

(5) $\quad 3CH_3OH + PCl_3 + 2NH_3 \rightarrow$
$\quad\quad\quad (CH_3O)_2POH + CH_3Cl + 2NH_4Cl$ In this process phosphorus trichloride is added with vigorous stirring to at least the theoretical amount of alcohol. Fluidity of the reaction mixture is maintained by the use of an appropriate amount of an inert solvent such as benzene, toluene, petroleum ether, etc., or an excess of the reactant alcohol. The temperature is maintained in the range −20° C. to 50° C. and preferably in the range from 0° C. to 25° C. During the phosphorus trichloride addition, ammonia is added in such a way as to completely neutralize the excess hydrogen chloride formed. It should be emphasized that in order to form dialkyl hydrogen phosphites by this process one-third of the total hydrogen chloride evolved must react with the intermediate trialkyl phosphites (Equations 1 and 2) to convert these esters to the desired dialkyl products. The other two-thirds of the HCl, or excess HCl, must be completely removed from the reaction mixture. To accomplish these two aims two methods of ammonia addition have been successfully employed.

One method of ammonia addition is to neutralize all of the liberated hydrogen chloride during the first two-thirds of the reaction. To do this the reaction mixture must be kept neutral to slightly basic, i. e., pH 7.0–8.5, throughout this first reaction phase by the addition of ammonia with the addition of the first two-thirds of the phosphorus trichloride. Following this the last one-third of the phosphorus trichloride is added without ammonia. At the end of the first two-thirds of the reaction the main phosphorus-containing constituent in the reaction mixture is trimethyl phosphite.

(6) $3CH_3OH + PCl_3 + 3NH_3 \rightarrow (CH_3O)_3P + 3NH_4Cl$

During the last one-third of the reaction just enough hydrogen chloride is evolved to react with all of the trimethyl phosphite formed during the entire reaction so that the overall reaction becomes equivalent to Equation 5.

A second method of ammonia addition is to use enough ammonia to neutralize two-thirds of the hydrogen chloride (the excess HCl) as it is formed throughout the entire reaction. To do this the reaction mixture must be kept very slightly acidic, i. e., pH 5.5–6.9 throughout the entire reaction.

In both of these schemes a very close balance must be maintained between the rate of ammonia addition and the phosphorus trichloride addition. This can be accomplished by use of accurate proportioning pumps. However, my preferred method involves the use of an acid-base indicator, either chemical or electronic. Chemical indicators which may be used are of the type which show different colors in acidic and basic media, e. g., methyl red, methyl orange, etc. Methyl red is preferred since it changes color at an optimum pH range and is also resistant to attack by the chemicals contained in the reaction mixture. A number of types of electronic devices can be applied, e. g., potentiometric, conductiometric, etc. A potentiometric device such as the common pH meter is quite suitable.

It is worth emphasis that the addition of the ammonia in any other fashion than substantially as described above has been found to be unsatisfactory. The entire amount of ammonia cannot be added to the alcohol before the phosphorus trichloride is added since ammonia reacts vigorously with phosphorus trichloride in a well-known fashion to form phosphorus amido compounds. It has been known for many years that pyridine and other tertiary bases could be utilized in the preparation of dialkyl hydrogen phosphites. However, tertiary bases have been added at the beginning of the reaction. If ammonia were added in this fashion, complicated reactions would occur between the ammonia and phosphorus trichloride and the attempt would be a failure. The general types of reactions which are known to occur between ammonia and phosphorus trichloride are illustrated below:

$PCl_3 + 2NH_3 \rightarrow PNH_2Cl_2 + NH_4Cl$
$PNH_2Cl_2 + 2NH_3 \rightarrow P(NH_2)_2Cl + NH_4Cl$
$P(NH_2)_2Cl + 2NH_3 \rightarrow P(NH_2)_3 + NH_4Cl$
$PCl_3 + 5NH_3 \rightarrow HN=PNH_2 + 3NH_4Cl$ It is also important that if ammonia is added at the completion of the phosphorus trichloride-alcohol reaction, as has been reported in the literature for laboratory scale operation, yields are considerably less than when conditions of the present process are used. If this reported laboratory method of operation were employed on a large commercial scale for preparation of the lower molecular weight phosphites, i. e., methyl and ethyl derivatives, or on the secondary types, i. e., isopropyl, sec-butyl, etc., the total heat of the phosphorus trichloride-alcohol reaction plus the large heat of neutralization of the hydrogen chloride would be substantial and could not be adequately removed. The length of time involved in such an operation would be prohibitive to satisfactory yields of the desired ester. It is apparent, then, from the above description that the present process is unique. The essential feature is the controlled addition of ammonia into a dialkyl hydrogen phosphite reaction mixture in such a way as to neutralize the excess hydrogen chloride formed in the reaction. This may be accomplished by neutralization of all the hydrogen chloride formed during the first two-thirds of the reaction or by neutralizing two-thirds of the hydrogen chloride formed during the entire reaction.

The process may be carried out by using batch-type or continuous type operation. In a typical batch-type operation, a suitable reactor provided with mechanical stirring means, an ammonia bubbling inlet tube, pH meter electrodes and refrigerating means is charged with methanol (approximately twice the amount required for reaction since in this illustration the alcohol serves both as a reactant and solvent). Phosphorus trichloride is added gradually with vigorous stirring and cooling. Simultaneously sufficient ammonia is added to maintain the reaction mixture substantially neutral as determined by readings on the pH meter. The rate of phosphorus trichloride addition is regulated to maintain the temperature at 10° C. to 25° C. After two-thirds of the theoretical amount of phosphorus trichloride has been added, ammonia addition is stopped and the remainder of the phosphorus trichloride is added with the temperature still maintained at 10° C. to 25° C. During the final phase of the phosphorus trichloride addition a slight vacuum (a pressure of approximately 750 mm. of mercury) is maintained in the reaction chamber to remove methyl chloride vapors. When the phosphorus trichloride addition is complete, more ammonia is added to neutralize the small amount of remaining acidity. The temperature is then raised to approximately 30° C. and the vacuum is increased to an absolute pressure of 300 mm. to remove the last traces of methyl chloride. The ammonium salts are then removed by filtration. The filtrate is transferred to a still and after removal of the excess methyl alcohol the product is distilled at about 100 mm.

If a continuous process is employed, excess methanol (approximately 100–200% excess), phosphorus trichloride, and anhydrous ammonia are fed simultaneously into a suitable reaction zone provided with means for effecting intimate mixing of the reactants. The reaction zone is located in a heat exchanger for rapid removal of the heat of reaction. Electrodes for determining the acid-base ratio and a thermometer are properly positioned for measurement of the reaction conditions. The pH of the mixture is held at approximately 6 (mildly acid) and the temperature is maintained at 10° C. to 25° C. The reaction mixture is led through a continuous centrifuge or similar device for removal of the ammonium salts and then into a vacuum stripper and still. After removal of low-boiling materials, the product is distilled at about 100 mm.

The following specific examples serve to illustrate the invention.

EXAMPLE 1

*Preparation of dimethyl hydrogen phosphite*

By applying vacuum to the system, 198 pounds of methyl alcohol (100% excess) was drawn into an agitated 50 gallon reactor. A nickel drum containing 142 pounds of phosphorus trichloride was set on scales above the reactor, and a flexible copper tube was used to connect the outlet at the bottom of the drum to a sprinkler head in the reactor. A cylinder of anhydrous ammonia was also set on scales and connected to a sparger in the reactor by a flexible copper tube. The electrodes of the pH meter were inserted into an external circulation line on the reactor.

Refrigerant was then circulated through the jacket of the reactor, and when the temperature of the methyl alcohol in the reactor had dropped to 40° F., addition of $PCl_3$ and $NH_3$ was started. The rate of $PCl_3$ and $NH_3$ addition was adjusted so that the pH of the reaction mixture was held at 7.0, and the temperature was held at 65° F. By means of the scales, periodic checks were made of the weights of $PCl_3$ and $NH_3$ added.

After 95 pounds (⅔ of the total) of $PCl_3$ had been added in the manner described above, the addition of $NH_3$ was stopped, and the remaining $PCl_3$ was added, holding the temperature at 65° F. During this last ⅓ of the reaction, a slight vacuum was maintained on the reactor by means of the steam evacuator to remove the methyl chloride that was given off. During this step the pH of the reaction mixture dropped to 3.5.

When the addition of the $PCl_3$ was complete, $NH_3$ was added to bring the pH of the reaction mixture back to 7.0.

By means of heat and vacuum, the remaining methyl chloride was removed from the reaction mixture. A final temperature of 85° F. and a final vacuum of 300 mm. Hg were reached in this step.

At this point the reaction mixture was closed up in the reactor and left over-night.

The mixture was filtered in a vacuum filter. After the filter cake was sucked dry, it was washed with 110 pounds of methyl alcohol, and the wash combined with the original filtrate.

The clear mixture of filtrate and washings was now loaded back into the reactor (previously washed out) and distilled. The excess methyl alcohol was stripped off and saved, and the product was distilled, at a vacuum of 25 mm. Hg and a vapor temperature of 70–75° C.

Data relative to the above example are tabulated below.

| Time, Minutes | Reaction Temp., °F. | $PCl_3$ Added, Pounds | $NH_3$ Added, Pounds | pH | Remarks |
|---|---|---|---|---|---|
| 0 | 40 | 0 | 0 | 6.9 | Start reaction. |
| 30 | 46 | 5 | 2 | 7.1 | |
| 60 | 60 | 21 | 8 | 7.1 | |
| 120 | 65 | 53 | 19 | 7.0 | |
| 180 | 65 | 84 | 28 | 6.8 | |
| 195 | 60 | | | 6.0 | Change $NH_3$ cylinder. |
| 225 | 65 | 98 | 32 | 7.0 | $NH_3$ Stopped. |
| 265 | 65 | 142 | | 3.5 | $NH_3$ Started. |
| 300 | 65 | | 36 | 7.0 | Batch Neutral. |
| 360 | 85 | | | 7.0 | $CH_3Cl$ Removed. |

Estimated wt. mixture end of reaction_____lbs__ 324
Product in mixture (lab. test)_____percent__ 23
Expected yield product at this point_____lbs__ 75
Theoretical yield expected this point_____percent__ 66

*Filtration.*—Time required 3 hours

Wt. filter cake_____lbs__ 118
Wt. wash methanol_____lbs__ 110
Wt. filtrate plus wash_____lbs__ 293
Product in filtrate plus wash (lab test)___percent__ 29
Expected yield product at this point_____lbs__ 85
Theoretical yield expected at this point ___percent__ 74

*Distillation.*—Time required 3 hours

Wt. methyl alcohol recovered_____ 158 lbs.
Wt. distilled product_____ 79 lbs.
Sp. g. 20/4 distilled product_____ 1.192.
Boiling range distilled product (lab test)_____ 94% in 7° C.
Color distilled product_____ Yellow.
Turbidity_____ Suspended solids settle out.
Theoretical yield distilled product (based on $PCl_3$)_____ 69%.

EXAMPLE 2

*Preparation of dimethyl hydrogen phosphite*

In a similar equipment set-up to that described in Example 1, phosphorus trichloride and ammonia were added to methanol (100% excess) with the temperature held at 65° F. The rates of the phosphorus trichloride and ammonia additions were adjusted so that the pH of the reaction mixture was held at 6.0 throughout the reaction. During the reaction a slight vacuum was maintained on the reactor by means of the steam evacuator to remove the methyl chloride as it was formed.

After all of the phosphorus trichloride had been added, ammonia addition was continued until a final pH of 7.0 was reached. By means of heat and vacuum, the remaining methyl chloride was removed from the reaction mixture to a temperature of 85° F. and a final vacuum of 300 mm. Hg.

The mixture was vacuum filtered and the filter cake was washed with methanol. The clear filtrate and washings were loaded into a still and after excess methyl alcohol had been stripped off and saved, the product was vacuum distilled; B. P. 72–77° C. at 26 mm. Hg. The final yield of product was 75% based on the phosphorus trichloride charged.

EXAMPLE 3

*Preparation of diethyl hydrogen phosphite*

The reaction was carried out in a 500 ml. 4-neck flask fitted with a stirrer, dropping funnel, thermometer, calcium chloride tube, an apparatus for bubbling gaseous ammonia into the flask below the liquid surface and means for cooling. 103.7 g. of absolute ethanol (2.25 moles) was charged into the flask, and 103 g. of phosphorus trichloride (0.75 mole) was added dropwise with stirring at 15–20° C. over a period of 123 minutes. The mixture was kept just acid to methyl red by bubbling in ammonia gas. After the addition of $PCl_3$ was complete, the ammonium chloride was removed by filtration. The filter cake was washed with 50 ml. of hexane, and the filtrate and washings were stripped and vacuum distilled. The fraction boiling at 58–61° C. at 6 mm. of mercury pressure consisted of 93.2 g. (89.9% yield) of diethyl hydrogen phosphite of 99–100% purity.

EXAMPLE 4

*Preparation of dipropyl hydrogen phosphite*

The reaction was carried out in an apparatus similar to that described above in Example 3. 90.13 g. of n-propyl alcohol (1.5 moles) was charged into the flask, and 68.7 g. of phosphorus trichloride (0.5 mole) was added dropwise with stirring at 15–20° C. over a period of 47 minutes. The mixture was kept just acid to methyl red by bubbling in anhydrous ammonia gas. After the addition of $PCl_3$ was complete, the ammonium chloride was removed by filtration. The filter cake was washed with a little hexane, and the filtrate and washings were stripped and vacuum distilled. The fraction boiling at 88–91° C. at 10 mm. of mercury pressure consisted of 70.8 g. (85.2% yield) of dipropyl hydrogen phosphite of 97.5% purity.

EXAMPLE 5

*Preparation of diisopropyl hydrogen phosphite*

The reaction was carried out in an apparatus similar to that described in Examples 3 and 4. 90.13 g. of isopropyl alcohol (1.5 moles) was charged into the flask, and 68.7 g. of phosphorus trichloride (0.5 mole) was added dropwise with stirring at 15–20° C. over a period of 54 minutes. The mixture was kept just acid to methyl red by bubbling in anhydrous ammonia gas. After the addition of $PCl_3$ was complete, the ammonium chloride was removed by filtration. The filter cake was washed with 25 ml. of hexane and the filtrate and washings were stripped and then vacuum distilled. The fraction boiling at 71–3° C. at 10 mm. of mercury pressure consisted of 75.6 g. (91% yield) of diisopropyl hydrogen phosphite of 85–90% purity.

The process, although particularly applicable for the production of the lower (methyl, ethyl and propyl) dialkyl hydrogen phosphites it is not limited thereto excepting that as a practical consideration the higher dialkyl hydrogen phosphites, butyl, etc. can be made economically without the neutralization.

This application is a continuation-in-part of application Ser. No. 206,910, filed Jan. 19, 1951, in the name of William P. Boyer and Jesse Roger Mangham, now Patent No. 2,678,940.

I claim:

1. Process for the production of di-lower-alkyl hydrogen phosphite which comprises gradually introducing phosphorus trichloride into a reaction zone containing at least three molecules of an alcohol for each molecule of phosphorus trichloride introduced, mixing the alcohol and phosphorus trichloride, maintaining the mixture at a temperature within the range from −20° to 50° C. and introducing ammonia into the mixture simultaneously with the introduction of phosphorus trichloride to combine with hydrochloric acid as it is formed and maintain the reaction mixture during the introduction of the phosphorus trichloride within the pH range from 3.5 to 8.5, the total quantity of ammonia introduced into the mixture being sufficient to give an end reaction mixture having a pH within the range from just acid to methyl red to 7.

2. Process as defined in claim 1 in which the mixture is maintained just acid to methyl red throughout the period during which the phosphorus trichloride is introduced.

3. Process as defined in claim 1 in which the mixture is maintained at a pH within the range from 7.0 to 8.5 by the introduction of ammonia while two thirds of the phosphorus trichloride is introduced and the introduction of ammonia is stopped at this point.

4. Process as defined in claim 1 in which the phosphorus trichloride is introduced gradually into a pre-established body of the alcohol.

5. Process as defined in claim 1 in which the alcohol and the phosphorus trichloride are introduced into the reaction zone simultaneously at the rate of about three molecules of the alcohol to about one molecule of the phosphorus trichloride.

References Cited in the file of this patent

UNITED STATES PATENTS

| 2,570,512 | Bloch | Oct. 9, 1951 |
| 2,678,940 | Boyer et al. | May 18, 1954 |

OTHER REFERENCES

McCombie et al.: J. Chem. Soc., 1945, pages 380–381.
Kosolapoff: Organo-phosphorus Compounds, John Wiley & Sons, New York, N. Y., 1950, pages 180–184.